United States Patent
Ijichi et al.

(10) Patent No.: US 10,774,921 B2
(45) Date of Patent: Sep. 15, 2020

(54) CONTINUOUSLY VARIABLE TRANSMISSION

(71) Applicant: TOYOTA JIDOSHA KABUSHIKI KAISHA, Toyota-shi, Aichi-ken (JP)

(72) Inventors: Akira Ijichi, Odawara (JP); Keisuke Ninomiya, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 121 days.

(21) Appl. No.: 15/453,135

(22) Filed: Mar. 8, 2017

(65) Prior Publication Data

US 2017/0261092 A1    Sep. 14, 2017

(30) Foreign Application Priority Data

Mar. 10, 2016  (JP) ................................ 2016-046704

(51) Int. Cl.
*F16H 57/04* (2010.01)
*F16H 9/18* (2006.01)

(52) U.S. Cl.
CPC ........... *F16H 57/0423* (2013.01); *F16H 9/18* (2013.01); *F16H 57/0457* (2013.01); *F16H 57/0489* (2013.01)

(58) Field of Classification Search
CPC .. F16H 57/0489; F16H 57/035; F16H 57/031; F16H 57/0416; F16H 9/18
USPC ....................................................... 474/144
See application file for complete search history.

(56) References Cited

U.S. PATENT DOCUMENTS

| 4,344,500 | A  | * | 8/1982 | Kurata | .................... B62M 7/06 180/230 |
| 5,800,299 | A  | * | 9/1998 | Lamers | ............... F16H 57/0421 474/45 |
| 6,238,312 | B1 | * | 5/2001 | Tsubata | ................. F16H 37/021 474/144 |
| 6,267,700 | B1 | * | 7/2001 | Takayama | ............... F02B 61/02 474/144 |
| 6,338,688 | B1 | * | 1/2002 | Minami | ................ F16H 57/029 474/144 |
| 6,398,683 | B1 | * | 6/2002 | Fukuda | .................... B62J 13/00 180/219 |

(Continued)

FOREIGN PATENT DOCUMENTS

| CN | 102016359 A | 4/2011 |
| DE | 69916952 T2 | 5/2005 |

(Continued)

*Primary Examiner* — Henry Y Liu
(74) *Attorney, Agent, or Firm* — Hunton Andrews Kurth LLP (57) ABSTRACT

A continuously variable transmission includes: a primary pulley; a secondary pulley; a power transmission member; a case; and a shield member. The shield member is disposed between an inner surface of the case and a first pulley that is one of the primary pulley and the secondary pulley, at a position on an opposite side of the first pulley from a second pulley that is another one of the primary pulley and the secondary pulley. The shield member includes a plate part that is configured to cover a part of an outer circumference of the first pulley, where the power transmission member is wound, such that the plate part intersects with a minimum width extension line and a maximum width extension line.

8 Claims, 5 Drawing Sheets (56) References Cited

U.S. PATENT DOCUMENTS

| | | | | |
|---|---|---|---|---|
| 7,201,686 | B2* | 4/2007 | Masuda | B62M 7/02 180/230 |
| 7,281,596 | B2* | 10/2007 | Fukuda | F16H 57/0415 180/376 |
| 7,281,603 | B2* | 10/2007 | Fukuda | F02B 61/02 180/357 |
| 7,303,495 | B2* | 12/2007 | Schoenek | F16C 35/067 384/542 |
| 7,631,718 | B2* | 12/2009 | Masuda | F16H 9/18 180/230 |
| 7,686,137 | B2* | 3/2010 | Tominaga | F16H 57/0406 184/11.3 |
| 7,771,299 | B2* | 8/2010 | Mochizuki | F16H 9/18 180/229 |
| 7,984,791 | B2* | 7/2011 | Taguchi | F16H 57/0483 184/11.1 |
| 8,186,244 | B2* | 5/2012 | Matsumoto | B62M 6/55 74/606 R |
| 8,439,141 | B2* | 5/2013 | Bessho | B60K 5/04 180/339 |
| 8,911,312 | B2* | 12/2014 | Itoo | F16H 57/03 474/93 |
| 9,182,031 | B2* | 11/2015 | Kouma | F16H 57/035 |
| 9,453,573 | B2* | 9/2016 | Renner | F16H 57/0489 |
| 9,809,244 | B2* | 11/2017 | Tetsuka | B62D 5/0424 |
| 9,863,523 | B2* | 1/2018 | Stocks | F16H 57/0416 |
| 9,909,659 | B2* | 3/2018 | Bessho | F16H 57/027 |
| 10,066,728 | B2* | 9/2018 | Yolitz | F16H 55/56 |
| 10,179,506 | B2* | 1/2019 | Yagyu | B60W 20/30 |
| 2001/0029215 | A1* | 10/2001 | Ohyama | B62M 7/12 474/148 |
| 2004/0089494 | A1* | 5/2004 | Fukuda | F02B 61/02 180/377 |
| 2006/0264284 | A1 | 11/2006 | Iwaki | |
| 2007/0219030 | A1* | 9/2007 | Ho | F16H 57/035 474/144 |
| 2010/0099526 | A1 | 4/2010 | Tsukuda et al. | |
| 2010/0101351 | A1 | 4/2010 | Lafer et al. | |
| 2012/0055728 | A1* | 3/2012 | Bessho | B60K 5/04 180/292 |
| 2012/0055729 | A1* | 3/2012 | Bessho | B60K 5/04 180/309 |
| 2014/0113766 | A1* | 4/2014 | Yagyu | B60W 20/30 477/5 |
| 2014/0187366 | A1* | 7/2014 | Kouma | F16H 57/031 474/8 |
| 2017/0043658 | A1* | 2/2017 | Yagyu | B60W 20/30 |
| 2017/0045122 | A1* | 2/2017 | Yolitz | F16H 7/20 |
| 2017/0045131 | A1* | 2/2017 | Yolitz | F16H 55/56 |
| 2017/0045134 | A1* | 2/2017 | Wade | F04D 25/02 |

FOREIGN PATENT DOCUMENTS

| | | |
|---|---|---|
| JP | S43030974 Y1 | 12/1968 |
| JP | 2010096272 A | 4/2010 |
| JP | 2013-007438 A | 1/2013 |

* cited by examiner

CONTINUOUSLY VARIABLE TRANSMISSION

INCORPORATION BY REFERENCE

The disclosure of Japanese Patent Application No. 2016-046704 filed on Mar. 10, 2016 including the specification, drawings and abstract is incorporated herein by reference in its entirety.

BACKGROUND

1. Technical Field

The present disclosure relates to a continuously variable transmission composed mainly of a pair of pulleys and a power transmission member wound around the pulleys.

2. Description of Related Art

Japanese Patent Application Publication No. 2013-7438 describes a chain-driven continuously variable transmission that uses a chain as transmission means. The continuously variable transmission includes an input pulley into which torque generated by a drive power source is input, and an output pulley from which the torque transmitted from the input pulley through the chain is output. Each pulley of the continuously variable transmission includes a fixed sheave that is integral with a rotating shaft and a movable sheave that is configured to be able to move in an axial direction of the rotating shaft closer to or farther away from the fixed sheave. The sides of the sheaves facing each other have conical surfaces. A groove around which the chain is wound is formed between the conical surfaces. As the width of the groove in each pulley changes, the winding radius of the chain in each pulley changes, and results in a continuous change in the transmission gear ratio (or speed ratio).

SUMMARY

In the chain-driven continuously variable transmission using a chain described in JP 2013-7438 A, in a case where the chain breaks, the broken chain may collide against the case of the continuously variable transmission. For example, in a case where the chain breaks at a part on the side where the chain is pulled, a part of the broken chain that is wound around an idler pulley (or output pulley or secondary pulley) moves linearly from the idler pulley toward a drive pulley (or input pulley or primary pulley). The moment the chain winds on the drive pulley, the chain is subjected to a centrifugal force. Then, the end of the chain created by the breakage may be swung toward the outer side of the drive pulley and collide against the inner surface of the case. It is therefore necessary to appropriately protect the case.

The present disclosure provides a continuously variable transmission that can prevent or minimize the risk of collision of a broken chain against the case in the event of chain breakage.

According to one aspect of the disclosure, a continuously variable transmission includes: a primary pulley having a first pulley groove; a secondary pulley having a second pulley groove; a power transmission member wound around each of the first pulley groove and the second pulley groove, the power transmission member being configured to transmit torque between the primary pulley and the secondary pulley; a case housing the primary pulley, the secondary pulley, and the power transmission member; and a shield member disposed between an inner surface of the case and a first pulley that is one of the primary pulley and the secondary pulley, at a position on an opposite side of the first pulley from a second pulley that is another one of the primary pulley and the secondary pulley. The primary pulley, the secondary pulley, and the power transmission member are configured such that a transmission gear ratio is changed as a groove width of the first pulley groove and a groove width of the second pulley groove are respectively changed between a minimum width and a maximum width. The shield member includes a plate part that is configured to cover a part of an outer circumference of the first pulley, where the power transmission member is wound, such that the plate part intersects with a minimum width extension line and a maximum width extension line. The minimum width extension line is a line extended toward the shield member from a line tangent to the first pulley at a point at which the power transmission member starts to wind on the first pulley when the groove width of the first pulley is the minimum width. The maximum width extension line is a line extended toward the shield member from a line tangent to the first pulley at a point at which the power transmission member starts to wind on the first pulley when the groove width of the first pulley is the maximum width.

According to the above mentioned aspect, the plate part may include an arc-shaped portion extending along the outer circumference of the first pulley.

According to the above mentioned aspect, the plate part may have a first end located further on an outer circumferential side in a radial direction of the first pulley than the maximum width extension line, and a second end located on the opposite side of the minimum width extension line from the first end.

According to the above mentioned aspect, the second end may be located further on the outer circumferential side in the radial direction of the first pulley than a line extended toward the shield member from a line tangent to the power transmission member at a point at which the power transmission member leaves the first pulley for the second pulley in a state where the groove width of the first pulley is maximum.

According to the above mentioned aspect, the second end may be provided in such a direction as to guide the power transmission member in a direction parallel to a straight line connecting rotation center axes of the first pulley and the second pulley, or in a direction further toward an outer side in a radial direction of the second pulley than the parallel direction.

According to the above mentioned aspect, the first pulley and the second pulley may be disposed such that rotation center axes of the first pulley and the second pulley are horizontal. The second end may be disposed on a lower side of the first pulley. A flange extending toward an inner side in the radial direction of the first pulley so as to face a side surface of the first pulley may be provided in an area of a predetermined length on a second end side. The shield member may have a U-shaped cross-section at the area.

According to the above mentioned aspect, an interval between the plate part and an outer circumferential edge of the first pulley may be larger than an interval between the first pulley and another part of the shield member than the plate part. In the present disclosure, the interval between the plate part and an outer circumferential edge of the first pulley may be larger than the interval between the first pulley and the other part of the shield member than the plate part.

According to the present disclosure, the shield member is disposed between the inner surface of the case and the first pulley that is one of the pulleys. The shield member includes the plate part covering the outer circumference of the first pulley on the opposite side from the second pulley that is the other one of the pulleys. In a case where the power transmission member, such as a chain, breaks at a part on the side where the chain is pulled, a part of the broken power transmission member that is wound around the second pulley moves linearly toward the first pulley. Then, the moment the chain winds on the first pulley, the chain is subjected to a centrifugal force, so that the end of the chain created by the breakage is swung toward the outer side of the first pulley and collides against the case. In this regard, according to the present disclosure, the above-described shield member is provided, so that the broken power transmission member collides against the plate part of the shield member. Thus, it is possible to minimize or avoid the risk of collision of the broken power transmission member against the case.

According to the present disclosure, the plate part includes the arc-shaped portion extending along the outer circumference of the first pulley. Thus, when the broken power transmission member collides against the plate part, the impact force caused by the collision on the plate part can be dispersed. Accordingly, the durability of the plate part can be enhanced.

According to the present disclosure, the plate part has the one end located further on the outer circumferential side in the radial direction of the first pulley than the line extended toward the shield member from the line tangent to the power transmission member at the point at which the power transmission member starts to wind on the first pulley in a state where the winding radius of the power transmission member in the first pulley is maximum, and the second end located on the opposite side, from the first end, of the line extended toward the shield member from the line tangent to the power transmission member at the point at which the power transmission member starts to wind on the first pulley in a state where the winding radius of the power transmission member in the first pulley is minimum. Thus, when the broken power transmission member moves as described above, the risk of collision of the broken power transmission member against the case can be minimized regardless of the transmission gear ratio.

According to the present disclosure, the second end is located further on the outer circumferential side in the radial direction of the first pulley than the line extended toward the shield member from the line tangent to the power transmission member at the point at which the power transmission member leaves the first pulley for the second pulley in a state where the winding radius in the first pulley is maximum. Thus, in whichever direction the pulleys may be rotating at the time of chain breakage, the risk that the end created by the breakage of the power transmission member may collide against the case can be minimized.

According to the present disclosure, the second end of the plate part is formed in such a direction as to guide the power transmission member in a direction parallel to the straight line connecting the rotation center axes of the first pulley and the second pulley, or in a direction further toward the outer side in the radial direction of the second pulley than the parallel direction. Thus, it is possible to minimize or avoid the risk that the broken power transmission member may be stuck in the pulley groove of the second pulley after colliding against the plate part and flying out from the second end side.

According to the present disclosure, the second end is disposed on the lower side of the first pulley in the vertical direction. Moreover, the flange extending toward the inner side in the radial direction of the first pulley so as to face the side surface of the first pulley is formed in an area of a predetermined length on the second end side. Thus, when lubricating oil is retained inside the case, the risk that the first pulley may be affected by the oil retained on the opposite side of the flange from the first pulley in the above area can be minimized or avoided.

According to the present disclosure, the interval between the plate part and the outer circumferential edge of the first pulley is larger than the interval between the other part of the shield member and the first pulley. Thus, it is possible to minimize or avoid the risk that the power transmission member may be caught or stuck between the outer circumferential edge of the first pulley and the plate part.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
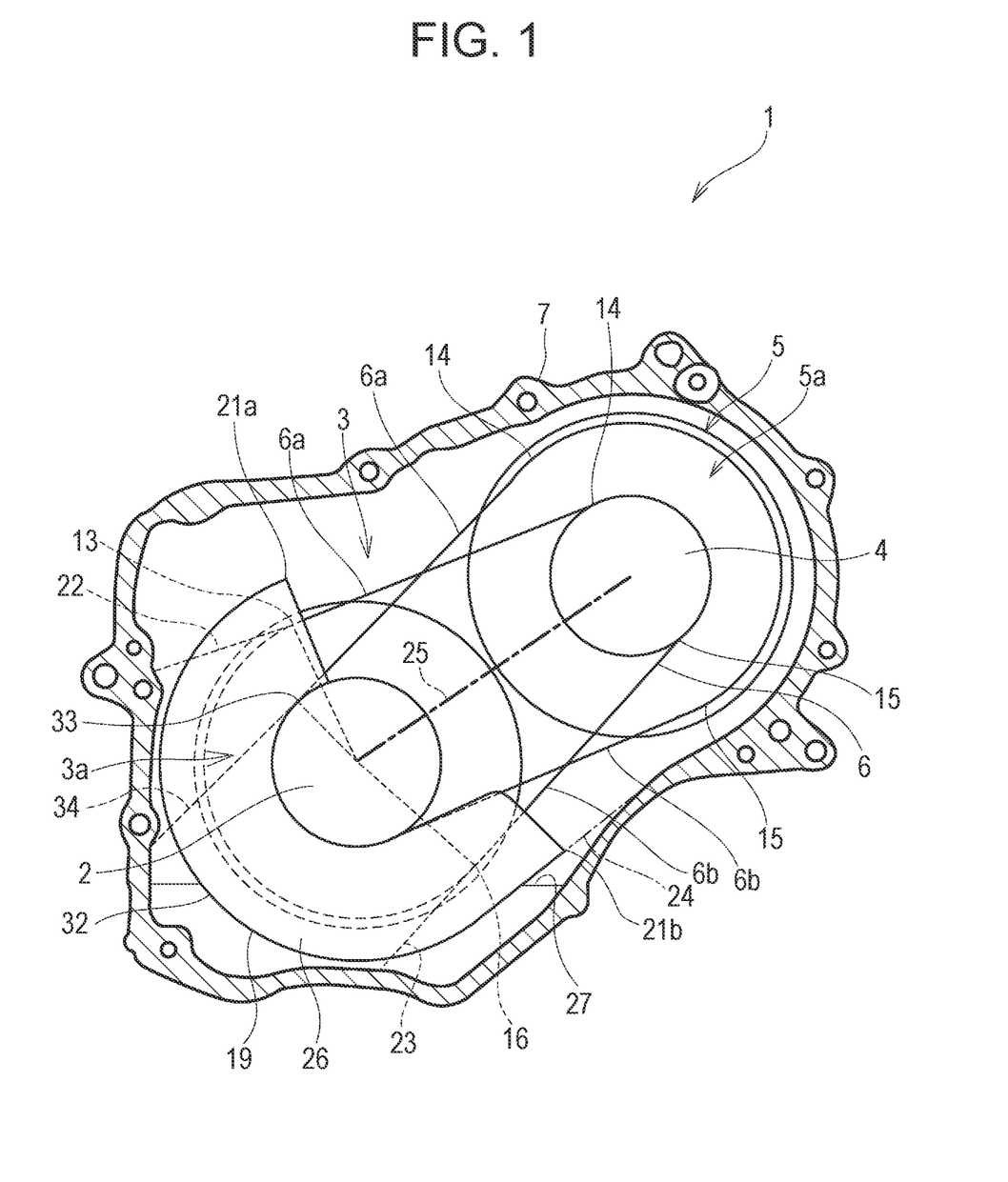
FIG. 1 is a view showing a continuously variable transmission according to the present disclosure, along with a part of a case housing the continuously variable transmission.

FIG. 1 shows one example of the configuration of a continuously variable transmission (hereinafter written as a CVT) 1 in an embodiment of the present disclosure. The CVT 1 shown in FIG. 1 includes an input shaft 2 to which torque is transmitted from a drive power source (not shown), a primary pulley 3 that integrally rotates with the input shaft 2, an output shaft 4 that transmits torque to output members, such as a drive shaft and a drive wheel (neither is shown), a secondary pulley 5 that integrally rotates with the output shaft 4, a chain 6 that is wound around a pulley groove 3a of the primary pulley 3 and a pulley groove 5a of the secondary pulley 5, and a case 7. The pulley groove 3a of the primary pulley 3 is an example of the first pulley groove, and the pulley groove 5a of the secondary pulley 5 is an example of the second pulley groove. The case 7 supports the input shaft 2 and the output shaft 4 disposed horizontally and in parallel to each other, and the like. The case 7 houses the primary pulley 3, the secondary pulley 5, the chain 6, etc. In this embodiment, the left-right direction in FIG. 1 corresponds to the front-rear direction of a vehicle, and the upper-lower direction in FIG. 1 corresponds to the vertical direction. The counterclockwise direction of the pulleys 3, 5 in FIG. 1 is a direction in which the pulleys 3, 5 rotate when the vehicle moves forward. FIG. 1 shows both a state where the winding radius of the chain 6 wound around the primary pulley 3 is maximum, and a state where the winding radius of the chain 6 wound around the primary pulley 3 is minimum. Here, the state of the maximum winding radius refers to a state where the groove width of the pulley groove 3a (or pulley groove 5a) is a minimum width, while the state of the minimum winding radius refers to a state where the groove width of the pulley groove 3a (or pulley groove 5a) is a maximum width. Moreover, the winding radius here refers to the radius of curvature of a part where the chain 6 and the pulley groove 3a (or pulley groove 5a) are in contact with each other when the chain 6 is wound around the pulley groove 3a (or pulley groove 5a).

Figure 2:
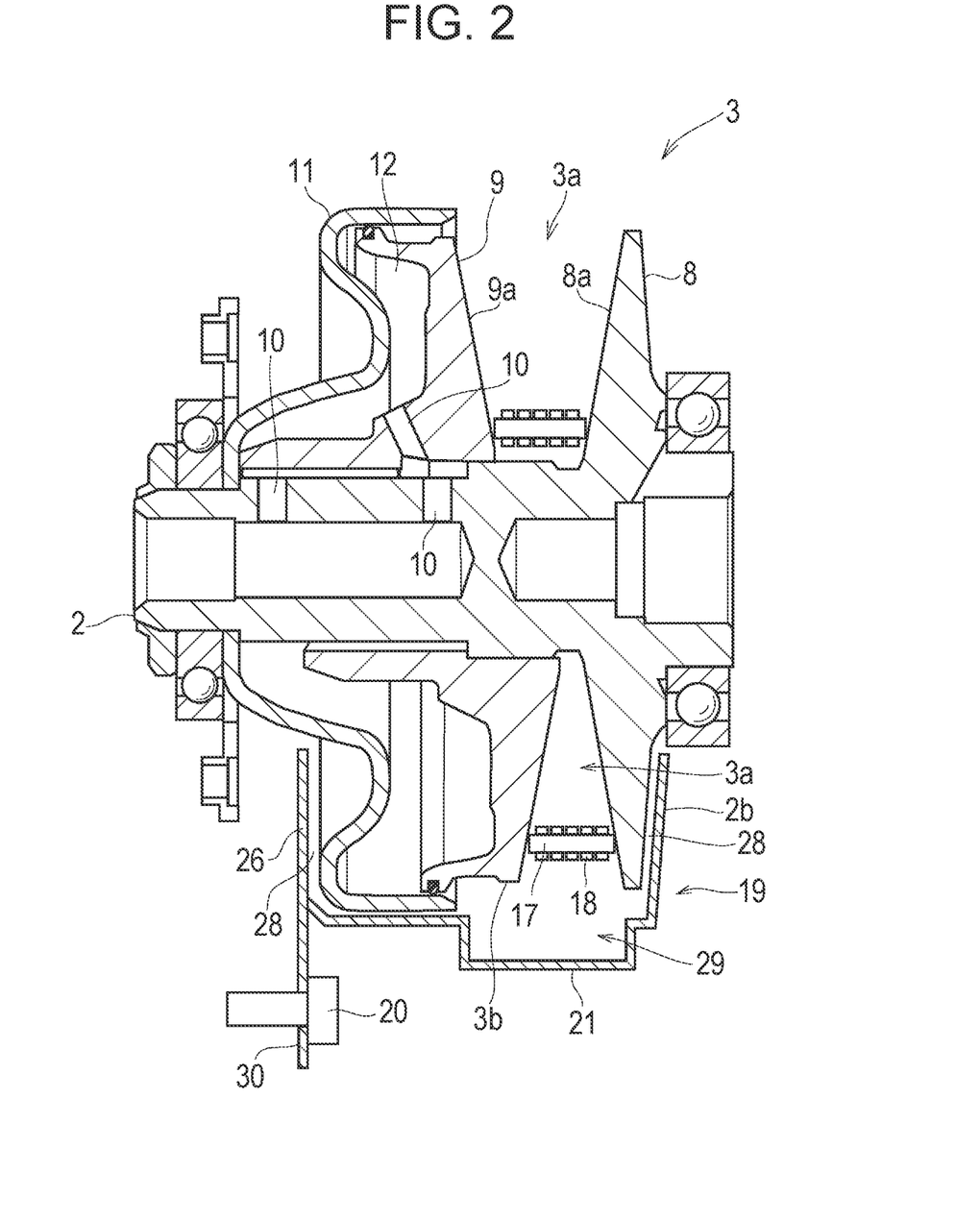
FIG. 2 is a sectional view of a primary pulley of FIG. 1 as seen from the side of a secondary pulley.

The primary pulley 3 corresponds to the first pulley in the embodiment of the present disclosure, and is composed of a fixed sheave 8 and a movable sheave 9 disposed face to face as shown in FIG. 2. The primary pulley 3 on the upper side in FIG. 2 is shown in a state where the winding radius of the chain 6 is minimum, while the primary pulley 3 on the lower side in FIG. 2 is shown in a state where the winding radius of the chain 6 is maximum. The fixed sheave 8 is formed integrally with the input shaft 2. The movable sheave 9 is configured so as to be able to integrally rotate with the input shaft 2 as well as to move in an axial direction. The movable sheave 9 is mounted on the input shaft 2 by means of a spline, for example. A tapered surface 8a of the fixed sheave 8 and a tapered surface 9a of the movable sheave 9 face each other in the axial direction of the input shaft 2. The pulley groove 3a is defined between the tapered surface 8a and the tapered surface 9a. The primary pulley 3 further includes a bottom-closed cylindrical housing 11 formed so as to surround the radially outer side of the movable sheave 9. An oil chamber 12 is formed between a bottom surface of the housing 11 and the movable sheave 9. Oil is supplied to the oil chamber 12 from an oil pump (not shown) through an oil path 10 formed inside the input shaft 2. The amount of movement of the movable sheave 9 in the axial direction is determined through the control of the amount of oil supplied.

The secondary pulley 5 corresponds to the second pulley in the embodiment of the present disclosure, and has the same configuration as the primary pulley 3. Specifically, the secondary pulley 5 is composed of a fixed sheave and a movable sheave (neither is shown) disposed face to face. The fixed sheave is integrally formed with the output shaft 4. The movable sheave is configured to be able to integrally rotate with the output shaft 4 as well as to move in the axial direction. The movable sheave is mounted on the output shaft 4 by means of a spline, for example. A tapered surface of the fixed sheave and a tapered surface of the movable sheave are disposed face to face in the axial direction of the output shaft 4, so that the pulley groove 5a is defined therebetween. The secondary pulley 5 is also provided with a hydraulic actuator (not shown) that presses the movable sheave in the axial direction.

The chain 6 is wound around the pulley groove 3a of the primary pulley 3 and the pulley groove 5a of the secondary pulley 5. The chain 6 is a power transmission member that transmits torque between the primary pulley 3 and the secondary pulley 5. In a state where the winding radius in the primary pulley 3 is maximum, the chain 6 includes: a first point 13 that is a point at which the chain 6 starts to wind on the primary pulley 3; a second point 14 that is a point at which the chain 6 leaves the secondary pulley 5; a first chord 6a between the first point 13 and the second point 14; a third point 15 that is a point at which the chain 6 starts to wind on the secondary pulley 5; a fourth point 16 that is a point at which the chain 6 leaves the primary pulley 3 for the secondary pulley 5; and a second chord 6b between the third point 15 and the fourth point 16. The first chord 6a and the second chord 6b are parts where the chain 6 moves linearly between the primary pulley 3 and the secondary pulley 5. As shown in FIG. 2, the chain 6 is composed of a plurality of links 18 coupled together with pins 17. The pins 17 are clamped in each of the pulleys 3, 5. As the pins 17 are pulled from the primary pulley 3, torque is transmitted through the links 18 to the secondary pulley 5. Alternatively, the power transmission member in the embodiment of the present disclosure may be a pushbelt. Although not shown, a pushbelt is composed of a plurality of elements stringed together through rings.

As described above, the CVT 1 transmits torque between the primary pulley 3 and the secondary pulley 5, i.e., between the input shaft 2 and the output shaft 4, through the chain 6. The CVT 1 is configured to change the transmission gear ratio (or speed ratio) by changing the groove width of each of the pulley groove 3a and the pulley groove 5a. For example, the CVT 1 changes the groove width of the pulley groove 3a by controlling the hydraulic actuator of the primary pulley 3, and thus changes the winding radius of the chain 6 wound around the pulley groove 3a, so that the transmission gear ratio is changed. In other words, the gear is changed. In this case, since the circumferential length of the chain 6 is constant on the side of the secondary pulley 5, the groove width of the pulley groove 5a changes according to the changes in groove width of the pulley groove 3a. To suppress a slip between the chain 6 and the secondary pulley 5, the hydraulic actuator of the secondary pulley 5 is controlled so as to maintain an appropriate clamp pressure on the chain 6 in the pulley groove 5a.

Figure 3:
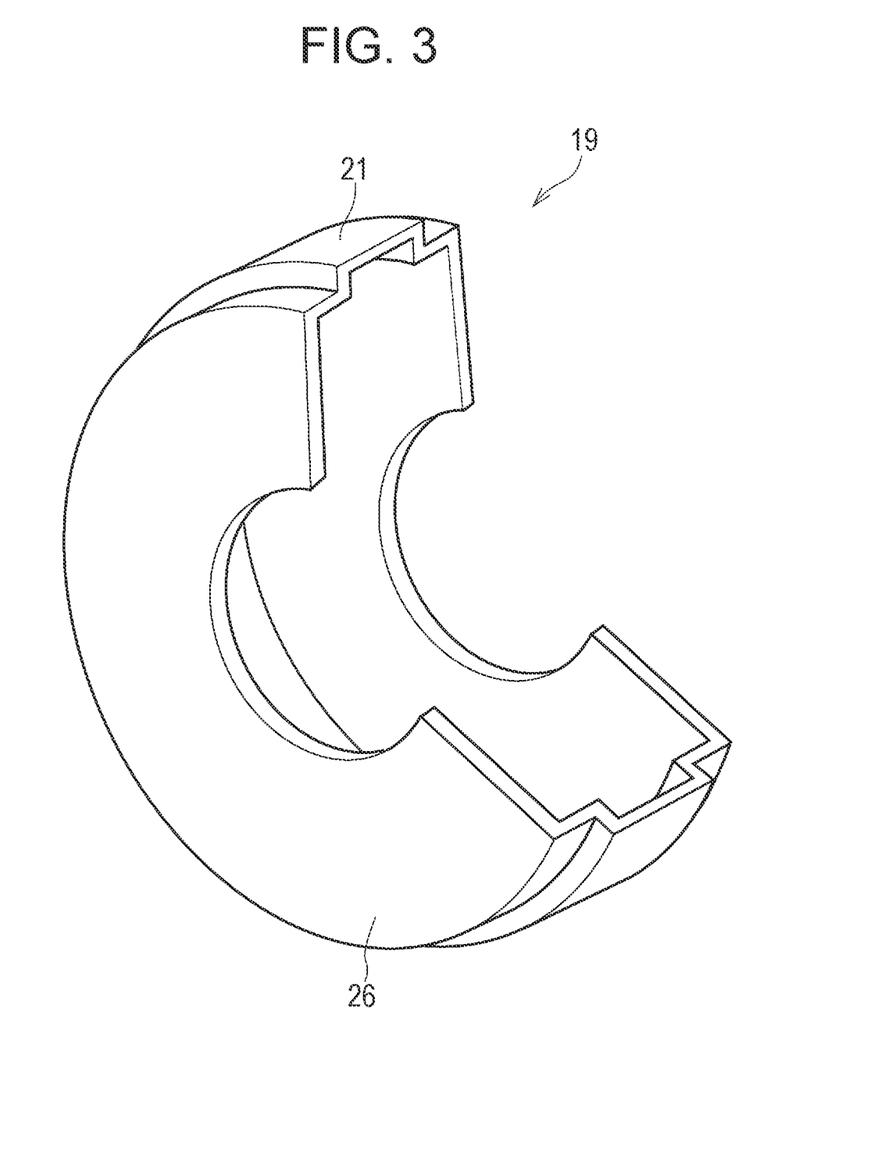
FIG. 3 is a view illustrating a baffle plate in an embodiment of the present disclosure.

As shown in FIG. 1, the CVT 1 in the embodiment of the present disclosure is provided with a baffle plate 19 that corresponds to the shield member in the embodiment of the present disclosure. The baffle plate 19 will be specifically described with reference to FIG. 1 to FIG. 3. As shown in FIG. 1, the baffle plate 19 is disposed between the primary pulley 3 and an inner surface of the case 7. The baffle plate 19 is made of an inexpensive, high-strength metal material, such as aluminum or iron, or a lightweight, high-strength resin material, such as carbon fiber reinforced plastics (CFRP). As shown in FIG. 2, the baffle plate 19 is mounted on the case 7 (not shown) with bolts 20.

The baffle plate 19 includes an outer circumferential wall 21 that covers an outer circumference of a part of the primary pulley 3 which is located on the opposite side of the primary pulley 3 from the secondary pulley 5 and on which the chain 6 is wound. The outer circumferential wall 21 includes an arc-shaped portion 32 that corresponds to the plate part in the embodiment of the present disclosure and extends along the outer circumference of the primary pulley 3. Specifically, the outer circumferential wall 21 includes a first end 21a that is located further on the outer circumferential side in the radial direction of the primary pulley 3 than a line extended toward the case 7 from a line 22 tangent to the chain 6 at the first point 13 in a state where the winding radius of the chain 6 in the primary pulley 3 is maximum. Here, the line extended toward the case 7 from the tangent line 22 is one example of the maximum width extension line. In other words, the outer circumferential wall 21 is configured so as to intersect with the line extended toward the baffle plate 19 from the line 22 tangent to the primary pulley 3 at the first point 13 of the chain 6. Moreover, in the example shown in FIG. 1, the first end 21a covers the radially outer side of the first point 13 in a state where the winding radius of the chain 6 is maximum. The outer circumferential wall 21 further includes a second end 21b that is located further on the outer circumferential side in the radial direction of the primary pulley 3 than the fourth point 16 of the chain 6, and on the lower side of the primary pulley 3. Moreover, in the example shown in FIG. 1, the second end 21b covers the radially outer side of the fourth point 16 in a state where the winding radius of the chain 6 is maximum. The second end 21b in this embodiment is located further on the outer circumferential side in the radial direction of the primary pulley 3 than a line 23 tangent at the fourth point 16 of the chain 6 in a state where the winding radius of the chain 6 in the primary pulley 3 is maximum.

The second end 21b of the outer circumferential wall 21 is formed so as to be separated by a predetermined distance from the outer circumference of the primary pulley 3. Specifically, a line 24 tangent to the second end 21b is parallel to a straight line 25 connecting a rotation center axis of the input shaft 2 and a rotation center axis of the output shaft 4. However, the configuration of the tangent line 24 is not limited to this example. The distance between the tangent line 24 and the input shaft 2 on a straight line orthogonal to the tangent line 24 and passing through the rotation center axis of the input shaft 2 may be shorter than the distance between the tangent line 24 and the output shaft 4 on a straight line orthogonal to the tangent line 24 and passing through the rotation center axis of the output shaft 4.

Moreover, the baffle plate 19 has a flange 26 that is formed in an area of a predetermined length at the second end 21b and extends toward the inner side in the radial direction of the primary pulley 3 so as to face the side surface of the primary pulley 3. Accordingly, the baffle plate 19 has a U-shaped cross-section in that area. The predetermined length of the flange 26 of this embodiment is a length in the circumferential direction of the outer circumferential wall 21 from the second end 21b to the first end 21a. As shown in FIG. 1, the second end 21b is formed at a higher level than a level of oil 27 retained in a lower part of the case 7. As shown in FIG. 2, the flange 26 is disposed at a predetermined interval 28 from an outer surface of the primary pulley 3 in the axial direction. The interval 28 is large enough so that the flange 26 does not come in contact with the rotating primary pulley 3, for example, while the vehicle is in motion, and is smaller than a space 29. In this embodiment, a portion 30 of the flange 26 extending toward the radially outer side serves as a seat through which the baffle plate 19 is fixed to the case 7 with the bolts 20.

As shown in FIG. 2, the interval (space) 29 between the outer circumferential wall 21 of the baffle plate 19 and an outer circumferential edge 3b of the primary pulley 3 is larger than the interval 28 between the other part of the baffle plate 19 than the outer circumferential wall 21 and the primary pulley 3. That is, the space 29 is formed in a part of the outer circumferential wall 21 facing the chain 6. The interval 28 is the interval 28 between the flange 26 and the housing 11, or the interval 28 between the flange 26 and the outer surface of the fixed sheave 8 in the axial direction, or the interval 28 between the outer circumferential wall 21 and the housing 11. Thus, the space 29 larger than the interval 28 is formed in the part of the baffle plate 19 where the outer circumferential wall 21 and the chain 6 face each other. It is preferable that the space 29 have a width larger than the width of the chain 6 and a height larger than the thickness of the chain 6.

With the baffle plate 19 thus provided, it is possible to prevent or minimize the risk of collision of the broken chain 6 against the case 7 in the event of breakage of the chain 6. The workings and effects of the baffle plate 19 will be described below.

When the primary pulley 3 rotates in the counterclockwise direction in FIG. 1, a larger tensile force acts on the first chord 6a than the second chord 6b in the chain 6, so that any breakage of the chain 6 is more likely to occur in the first chord 6a. When the first chord 6a thus breaks, the breakage is likely to occur at the first point 13 or the second point 14. In a case where the chain 6 breaks in the vicinity of the second point 14 in the first chord 6a, the end of the broken chain 6 may collide against the inner surface of the case 7. Specifically, the broken chain 6 moves linearly toward the first point 13 due to an inertial force and a force pulling the chain 6 from the primary pulley 3. Thereafter, the moment the chain 6 winds on the primary pulley 3, the chain 6 is subjected to a centrifugal force, so that the end of the chain 6 created by the breakage is swung toward the outer side of the primary pulley 3 and heads for the inner surface of the case 7. Here, as the baffle plate 19 is provided as described above, the broken chain 6 collides against the outer circumferential wall 21. Thus, it is possible to minimize or avoid the risk of collision of the broken chain 6 against the inner surface of the case 7.

The outer circumferential wall 21 of the baffle plate 19 extends from the line 22 tangent to the first point 13 and the line 23 tangent to the fourth point 16 to the radially outer side of the primary pulley 3. Thus, when the chain 6 breaks due to the above causes, the risk of collision of the broken chain 6 against the case 7 can be minimized or avoided regardless of the transmission gear ratio or the winding radii at the time of the breakage. Moreover, the outer circumferential wall 21 includes the arc-shaped portion 32. Thus, when the broken chain 6 collides against the plate part, the impact force caused by the collision on the outer circumferential wall 21 can be dispersed. Accordingly, the durability of the outer circumferential wall 21 can be enhanced.

After colliding against the outer circumferential wall 21, the chain 6 having broken as described above moves vertically downward along the outer circumferential wall 21. Meanwhile, the part of the chain 6 that has been clamped in the primary pulley 3 at the time of the breakage is pulled out from the side of the second chord 6b as the secondary pulley 5 rotates. Thus, after falling along the outer circumferential wall 21, the broken chain 6 passes through the second end 21b and flies toward the secondary pulley 5. Here, the second end 21b is formed in a direction parallel to the straight line 25 connecting the rotation center axis of the input shaft 2 and the rotation center axis of the output shaft 4, so that the broken chain 6 flies in a direction further vertically downward than the lower end of the secondary pulley 5 in the upper-lower direction. Thus, it is possible to minimize or avoid the risk that the broken chain 6 may move toward the pulley groove 5a of the secondary pulley 5. Accordingly, it is possible to minimize or avoid the risk that the end of the broken chain 6 may be caught in the pulley groove 5a of the secondary pulley 5.

Moreover, the baffle plate 19 is provided with the flange 26. The flange 26 can separate the oil 27 retained in a lower part of the case 7 and the primary pulley 3 from each other. Thus, even when the lubricating oil 27 is retained, it is possible to minimize or avoid the risk that the primary pulley 3 may be affected by the oil 27 retained on the opposite side of the flange 26 from the primary pulley 3. Specifically, the primary pulley 3 agitates the oil interposed between the primary pulley 3 and the baffle plate 19. As the amount of oil to be agitated is limited, the energy consumed in agitating the oil, i.e., a power loss, can be reduced. The inner surface of the case 7 has many recesses and protrusions. Accordingly, when the primary pulley 3 agitates the oil 27 retained inside the case 7, a turbulent flow easily occurs in the oil 27 due to the recesses and protrusions, which results in a power loss. In this regard, the levels of the second end 21b and the flange 26 are higher than the level of the oil 27 retained inside the case 7 in this embodiment. Thus, the primary pulley 3 agitates the oil retained inside the baffle plate 19. Moreover, the inner surface of the baffle plate 19 is smooth compared with the inner surface of the case 7. Thus, the risk of occurrence of a turbulent flow in the oil can be minimized compared with when the oil 27 retained inside the case 7 is agitated. This means that the power loss incurred as the primary pulley 3 agitates the oil can be reduced.

Moreover, the flange 26 can enhance the strength of the baffle plate 19, as well as can minimize the risk that the broken chain 6 may fly out in the vehicle left-right direction. Accordingly, the risk of collision of the broken chain 6 against the inner surface of the case 7 can be further minimized. Furthermore, in the above embodiment, the flange is formed along the side surfaces of the housing 11 and the fixed sheave 8, so that the risk of entry of the oil into the baffle plate 19 can be minimized. As a result, the amount of oil to be agitated by the primary pulley 3 can be reduced and the power loss can be reduced.

In the part of the baffle plate 19 where the outer circumferential wall 21 faces the chain 6, the space 29 larger than the other part of the baffle plate 19 is formed. Thus, it is possible to minimize the risk that the broken chain 6 may be caught between the movable sheave 9 or the fixed sheave 8 and the outer circumferential wall 21 when the chain 6 is moving while colliding against or being guided by the outer circumferential wall 21.

Figure 4:
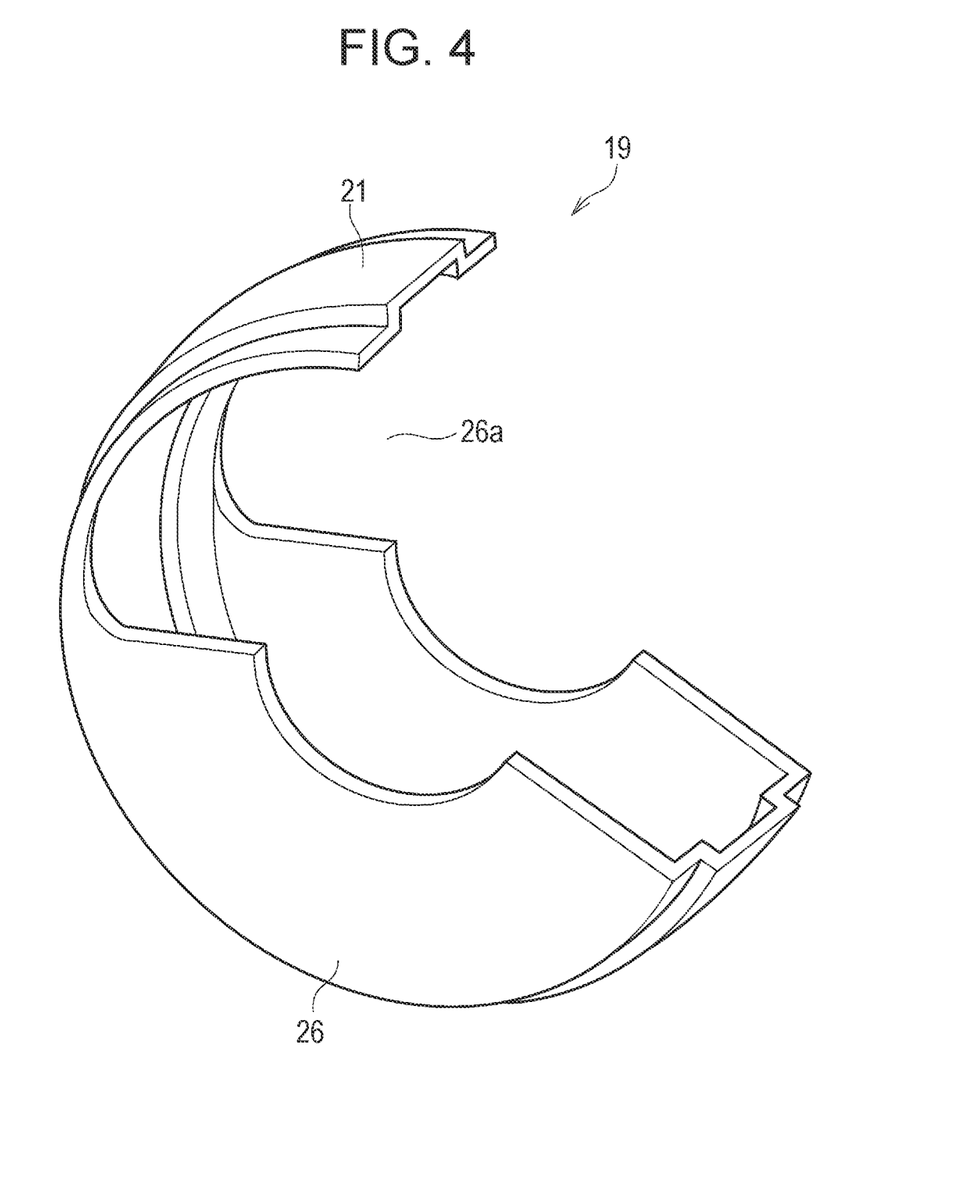
FIG. 4 is a view illustrating another embodiment of the baffle plate of the present disclosure.

Next, another embodiment of the baffle plate 19 of the present disclosure will be described. In the following description, the members that are the same as the members described in the above embodiment will be given the same reference signs. As shown in FIG. 4, the baffle plate 19 of this embodiment has the flange 26 up to a predetermined level in the vertical direction in a state where the continuously variable transmission is installed in the vehicle. This predetermined level is higher than the level of the second end 21b in the vertical direction. In other words, the baffle plate 19 in this embodiment has an opening 26a on the side of the first end 21a in the flange 26. In this embodiment, the end of the flange 26 on the side of the opening 26a extends in a horizontal direction. That is, the flange 26 in this embodiment is formed up to such a level that the oil 27 retained in a lower part of the case 7 and the oil retained inside the baffle plate 19 can be separated from each other.

Figure 5:
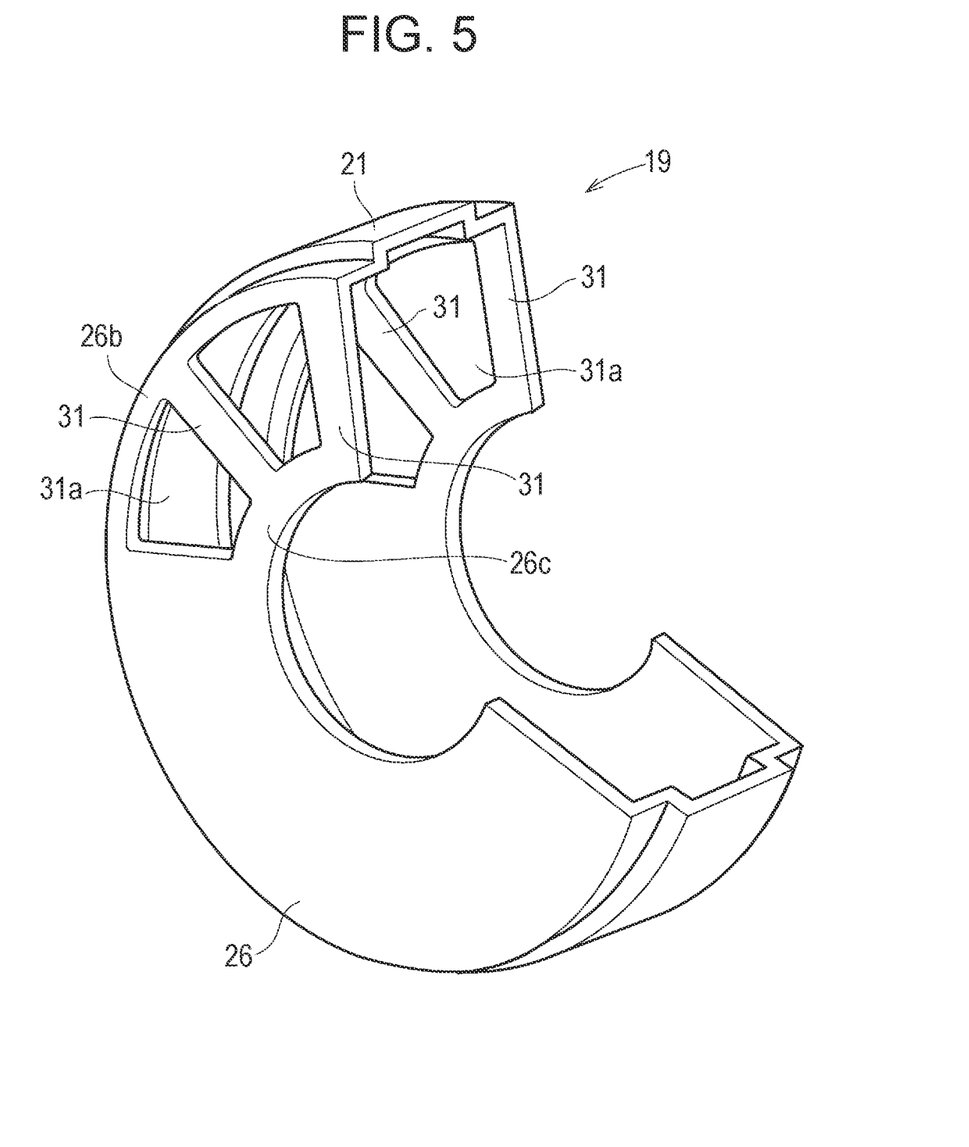
FIG. 5 is a view illustrating yet another embodiment of the baffle plate of the present disclosure.

Yet another embodiment of the baffle plate 19 of the present disclosure will be described. In the following description, the members that are the same as the members described in the above embodiments will be given the same reference signs. As shown in FIG. 5, the flange 26 of the baffle plate 19 of this embodiment is divided into an outer circumferential portion 26b and an inner circumferential portion 26c on the side of the first end 21a. The baffle plate 19 is provided with support members 31 connecting the inner circumferential portion 26c and the outer circumferential portion 26b to each other. Thus, the support members 31 serve as so-called spokes that connect the outer circumferential portion 26b and the inner circumferential portion 26c to each other. In other words, the baffle plate 19 of this embodiment has through-holes 31a penetrating in the axial direction that are provided on the side of the first end 21a of the flange 26, at predetermined intervals in the circumferential direction. In this embodiment, as with the baffle plate 19 of the preceding embodiment, the part of the baffle plate 19 up to a predetermined level in the vertical direction is not provided with the through-holes 31a and has the plate-like flange 26 formed therein. With the flange 26 thus formed, the baffle plate 19 can have enhanced strength compared with the baffle plate 19 of the preceding embodiment.

The above-described configurations are merely examples for making the present disclosure easy to understand, and are not intended to limit the disclosure unless otherwise noted. Various modifications can be made within the scope of the gist of the present disclosure described in the claims. For example, the outer circumferential wall 21 should be configured at least so as to intersect with the line extended toward the baffle plate 19 from the line 22 tangent to the primary pulley 3 at the point at which the chain 6 starts to wind on the primary pulley 3. The point may be the first point 13. The first point 13 is the point at which the chain 6 starts to wind on the primary pulley 3 in a state where the winding radius in the primary pulley 3 is maximum, i.e., in a state where the transmission gear ratio is minimum and the vehicle speed is high. Accordingly, in a case where the chain 6 breaks as described above while the vehicle speed is high, i.e., in a case where the chain breaks in the vicinity of the second point 14 while the primary pulley is rotating in the counterclockwise direction in FIG. 1, a comparatively large impact is caused by the collision of the broken chain 6 against the case 7. In this regard, in a case where the outer circumferential wall 21 is configured so as to intersect with the line extended toward the baffle plate 19 from the line 22 tangent to the primary pulley 3 at the first point 13, the outer circumferential wall 21 is present ahead of the moving end, when that end of the chain 6, created by breakage while the vehicle speed is high, moves as described above. Thus, it is possible to minimize or avoid the risk that a comparatively large impact may act on the case 7 as the chain 6 having broken while the vehicle speed is high collides against the case 7.

It is preferable that the first end 21a be located further on the outer circumferential side in the radial direction of the primary pulley 3 than the line extended toward the baffle plate 19 from the line 22 tangent to the primary pulley 3 at the first point 13, and that the second end 21b be located on the opposite side, from the first end 21a, of the line extended toward the baffle plate 19 from a line 34 tangent to the primary pulley 3 at the fifth point 33 at which the chain 6 starts to wind on the primary pulley 3 in a state where the winding radius in the primary pulley 3 is minimum. Here, the line extended from the tangent line 34 toward the baffle plate 19 is one example of the minimum width extension line. In a case where the baffle plate 19 is thus configured, the broken chain 6 can be brought into collision against the outer circumferential wall 21 regardless of the transmission gear ratio at the time of the breakage, so that the risk of collision of the broken chain 6 against the case 7 can be minimized. Moreover, it is preferable that the second end 21b be located further on the outer circumferential side in the radial direction of the primary pulley 3 than the line extended toward the baffle plate 19 from the line 23 tangent to the primary pulley 3 at the fourth point 16. In a case where the baffle plate 19 is thus configured, whether the primary pulley 3 is rotating in the counterclockwise or clockwise direction in FIG. 1 at the time of the breakage of the chain 6, the outer circumferential wall 21 is present in the direction in which the broken chain 6 moves due to the inertial force or the centrifugal force. Thus, the risk of collision of the broken chain 6 against the case 7 can be minimized.

In the above embodiment, the baffle plate 19 is not provided on the opposite side of the secondary pulley 5 from the primary pulley 3, as the inner surface of the case 7 on that side is shaped so as to extend along the shape of the outer circumference of the opposite side of the secondary pulley 5 from the primary pulley 3. However, the baffle plate 19 as described above may be provided as necessary on the side of the secondary pulley 5 as well. The second end should be configured at least in such a direction that the broken power transmission member does not head for the pulley groove of the pulley of the pulleys 3, 5 that the power transmission member would otherwise head for. For example, the second end may be configured so as to guide the broken power transmission member toward a lower part of the case 7. The type of the power transmission member is not limited to the chain-driven type, and another power transmission member, such as a pushbelt, may instead be used.

What is claimed is:

1. A continuously variable transmission comprising:
a primary pulley having a first pulley groove;
a secondary pulley having a second pulley groove;
a power transmission member wound around each of the first pulley groove and the second pulley groove, the power transmission member being configured to transmit torque between the primary pulley and the secondary pulley;
a case housing the primary pulley, the secondary pulley, and the power transmission member; and
a shield member disposed between an inner surface of the case and a first pulley that is one of the primary pulley and the secondary pulley, at a position on an opposite side of the first pulley from a second pulley that is another one of the primary pulley and the secondary pulley, wherein
the primary pulley, the secondary pulley, and the power transmission member are configured such that a transmission gear ratio is changed as a groove width of the first pulley groove and a groove width of the second pulley groove are respectively changed within a range from a minimum width to a maximum width,
the shield member includes a plate part, the plate part being configured to cover a part of an outer circumference of the first pulley, where the power transmission member is wound, such that the plate part intersects with a minimum width extension line and a maximum width extension line,
the minimum width extension line is a line extended toward the shield member from a line tangent to the first pulley at a point at which the power transmission member starts to wind on the first pulley when the groove width of the first pulley is the minimum width, and
the maximum width extension line is a line extended toward the shield member from a line tangent to the first pulley at a point at which the power transmission member starts to wind on the first pulley when the groove width of the first pulley is the maximum width,
wherein at least a portion of the first pulley is disposed below a lower side of the second pulley,
wherein the plate part has a first end located further on an outer circumferential side in a radial direction of the first pulley than the maximum width extension line, and a second end located on the opposite side of the minimum width extension line from the first end,
wherein the plate part includes a flange up to a level higher than a level of the second end in a vertical direction,
wherein the second end is located further on the outer circumferential side in the radial direction of the first pulley than a line extended toward the shield member from a line tangent to the power transmission member at a point at which the power transmission member leaves the first pulley for the second pulley in a state where the groove width of the first pulley is maximum,
wherein
the first pulley and the second pulley are disposed such that rotation center axes of the first pulley and the second pulley are horizontal,
the second end is disposed on a lower side of the first pulley,
the flange extending toward an inner side in the radial direction of the first pulley so as to face a side surface of the first pulley is provided in an area of a predetermined length on a second end side, and
the shield member has a U-shaped cross-section at the area, and
wherein the flange separates oil in a first pulley side from the oil in a case side in an entire portion of the plate part lower than the second end in a vertical direction.

2. The continuously variable transmission according to claim 1, wherein the plate part includes an arc-shaped portion extending along the outer circumference of the first pulley.

3. The continuously variable transmission according to claim 1, wherein the second end is located further on the outer circumferential side in the radial direction of the first pulley than a line extended toward the shield member from a line tangent to the power transmission member at a point at which the power transmission member leaves the first pulley for the second pulley in a state where the groove width of the first pulley is maximum.

4. The continuously variable transmission according to claim 3, wherein the second end is provided in such a direction as to guide the power transmission member in a direction parallel to a straight line connecting rotation center axes of the first pulley and the second pulley, or in a direction further toward an outer side in a radial direction of the second pulley than the parallel direction.

5. The continuously variable transmission according to claim 1, wherein an interval between the plate part and an outer circumferential edge of the first pulley is larger than an interval between the first pulley and another part of the shield member than the plate part.

6. A continuously variable transmission comprising:
a primary pulley having a first pulley groove;
a secondary pulley having a second pulley groove;
a power transmission member wound around each of the first pulley groove and the second pulley groove, the power transmission member being configured to transmit torque between the primary pulley and the secondary pulley;
a case housing the primary pulley, the secondary pulley, and the power transmission member; and
a shield member disposed between an inner surface of the case and a first pulley that is one of the primary pulley and the secondary pulley, at a position on an opposite side of the first pulley from a second pulley that is another one of the primary pulley and the secondary pulley, wherein
the primary pulley, the secondary pulley, and the power transmission member are configured such that a transmission gear ratio is changed as a groove width of the first pulley groove and a groove width of the second pulley groove are respectively changed within a range from a minimum width to a maximum width,
the shield member includes a plate part, the plate part being configured to cover a part of an outer circumference of the first pulley, where the power transmission member is wound, such that the plate part intersects with a minimum width extension line and a maximum width extension line, the minimum width extension line is a line extended toward the shield member from a line tangent to the first pulley at a point at which the power transmission member starts to wind on the first pulley when the groove width of the first pulley is the minimum width, and the maximum width extension line is a line extended toward the shield member from a line tangent to the first pulley at a point at which the power transmission member starts to wind on the first pulley when the groove width of the first pulley is the maximum width, wherein at least a portion of the first pulley is disposed below a lower side of the second pulley, wherein the plate part has a first end located further on an outer circumferential side in a radial direction of the first pulley than the maximum width extension line, and a second end located on the opposite side of the minimum width extension line from the first end, wherein the plate part includes a flange up to a level higher than a level of the second end in a vertical direction, wherein the second end is located further on the outer circumferential side in the radial direction of the first pulley than a line extended toward the shield member from a line tangent to the power transmission member at a point at which the power transmission member leaves the first pulley for the second pulley in a state where the groove width of the first pulley is maximum, wherein the first pulley and the second pulley are disposed such that rotation center axes of the first pulley and the second pulley are horizontal, the second end is disposed on a lower side of the first pulley, the flange extending toward an inner side in the radial direction of the first pulley so as to face a side surface of the first pulley is provided in an area of a predetermined length on a second end side, and the shield member has a U-shaped cross-section at the area, and wherein the flange separates a first pulley side space from a case side space in an entire portion of the plate part lower than the second end in a vertical direction.

7. A continuously variable transmission comprising:
a primary pulley having a first pulley groove;
a secondary pulley having a second pulley groove;
a power transmission member wound around each of the first pulley groove and the second pulley groove, the power transmission member being configured to transmit torque between the primary pulley and the secondary pulley;
a case housing the primary pulley, the secondary pulley, and the power transmission member; and
a shield member disposed between an inner surface of the case and a first pulley that is one of the primary pulley and the secondary pulley, at a position on an opposite side of the first pulley from a second pulley that is another one of the primary pulley and the secondary pulley, wherein
the primary pulley, the secondary pulley, and the power transmission member are configured such that a transmission gear ratio is changed as a groove width of the first pulley groove and a groove width of the second pulley groove are respectively changed within a range from a minimum width to a maximum width, the shield member includes a plate part, the plate part being configured to cover a part of an outer circumference of the first pulley, where the power transmission member is wound, such that the plate part intersects with a minimum width extension line and a maximum width extension line, the minimum width extension line is a line extended toward the shield member from a line tangent to the first pulley at a point at which the power transmission member starts to wind on the first pulley when the groove width of the first pulley is the minimum width, and the maximum width extension line is a line extended toward the shield member from a line tangent to the first pulley at a point at which the power transmission member starts to wind on the first pulley when the groove width of the first pulley is the maximum width, wherein at least a portion of the first pulley is disposed below a lower side of the second pulley, wherein the plate part has a first end located further on an outer circumferential side in a radial direction of the first pulley than the maximum width extension line, and a second end located on the opposite side of the minimum width extension line from the first end, wherein the plate part includes a flange up to a level higher than a level of the second end in a vertical direction, and wherein the second end is located further on the outer circumferential side in the radial direction of the first pulley than a line extended toward the shield member from a line tangent to the power transmission member at a point at which the power transmission member leaves the first pulley for the second pulley in a state where the groove width of the first pulley is maximum, and wherein the second end extends in a direction parallel to a straight line connecting rotation center axes of the first pulley and the second pulley, or in a direction further toward an outer side in a radial direction of the second pulley than the parallel direction.

8. A continuously variable transmission comprising:
a primary pulley having a first pulley groove;
a secondary pulley having a second pulley groove;
a power transmission member wound around each of the first pulley groove and the second pulley groove, the power transmission member being configured to transmit torque between the primary pulley and the secondary pulley;
a case housing the primary pulley, the secondary pulley, and the power transmission member; and
a shield member disposed between an inner surface of the case and a first pulley that is one of the primary pulley and the secondary pulley, at a position on an opposite side of the first pulley from a second pulley that is another one of the primary pulley and the secondary pulley, wherein
the primary pulley, the secondary pulley, and the power transmission member are configured such that a transmission gear ratio is changed as a groove width of the first pulley groove and a groove width of the second pulley groove are respectively changed within a range from a minimum width to a maximum width, the shield member includes a plate part, the plate part being configured to cover a part of an outer circumference of the first pulley, where the power transmission member is wound, such that the plate part intersects with a minimum width extension line and a maximum width extension line, the minimum width extension line is a line extended toward the shield member from a line tangent to the first pulley at a point at which the power transmission member starts to wind on the first pulley when the groove width of the first pulley is the minimum width, and the maximum width extension line is a line extended toward the shield member from a line tangent to the first pulley at a point at which the power transmission member starts to wind on the first pulley when the groove width of the first pulley is the maximum width, wherein at least a portion of the first pulley is disposed below a lower side of the second pulley, wherein the plate part has a first end located further on an outer circumferential side in a radial direction of the first pulley than the maximum width extension line, and a second end located on the opposite side of the minimum width extension line from the first end, wherein the plate part includes a flange up to a level higher than a level of the second end in a vertical direction, and wherein an interval between an outer circumferential wall of the plate part and an outer circumferential edge of the primary pulley is larger than an interval between the primary pulley and the other part of the plate part than the outer circumferential wall near the second end of the plate part.

* * * * *